United States Patent
Liu et al.

(10) Patent No.: US 7,539,657 B1
(45) Date of Patent: May 26, 2009

(54) BUILDING PARALLEL HYBRID SPILL TREES TO FACILITATE PARALLEL NEAREST-NEIGHBOR MATCHING OPERATIONS

(75) Inventors: Ting Liu, Pittsburgh, PA (US); Charles J. Rosenberg, Palo Alto, CA (US); Henry A. Rowley, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 329 days.

(21) Appl. No.: 11/346,022

(22) Filed: Feb. 1, 2006

Related U.S. Application Data (60) Provisional application No. 60/735,617, filed on Nov. 12, 2005.

(51) Int. Cl.
*G06F 17/00* (2006.01)
*G06N 5/00* (2006.01)
(52) U.S. Cl. .............................. 706/45; 706/46; 706/47
(58) Field of Classification Search .................... 706/20, 706/45, 46, 47
See application file for complete search history.

(56) References Cited

U.S. PATENT DOCUMENTS

| | | | | |
|---|---|---|---|---|
| 5,895,470 | A * | 4/1999 | Pirolli et al. ................. | 707/102 |
| 6,070,158 | A | 5/2000 | Kirsch | |
| 6,704,719 | B1 * | 3/2004 | Ericson ........................ | 706/48 |
| 7,292,255 | B2 * | 11/2007 | Doan et al. .................. | 345/629 |
| 2005/0267911 | A1 * | 12/2005 | Kamath et al. .......... | 707/103 R |
| 2006/0074907 | A1 | 4/2006 | Singhal | |

OTHER PUBLICATIONS

Liu et al. "An Investigation of Ptractical Approximate Nearest Neighbor Algorithms", 2004. Carnegie-Mellon University, pp. 1-8.*
Publication: "An Investigation of Practical Approximate Nearest Neighbor Algorithms", Liu et al., Advances in Neural Information Processing Systems (NIPS) 2004.
Publication: "Nearest-Neighbor Searching and Metric Space Dimensions", K.L. Clarkson, to appear in Nearest-Neighbor Methods for Learning and Vision: Theory and Practice, editors Darrell et al. Previous version Apr. 2005, Original Feb. 21, 2005.
Publication: "Mapreduce: Simplified Data Processing on Large Clusters", J. Dean and S. Ghemawat, Symposium on Operating System Design and Implementation (OSDI 2004), San Francisco, CA, Dec. 2004.
Notice of Allowance prepared by Examiner Thuy T. Bui for related case (U.S. Appl. No. 11/346,080), mailed from USPTO on Aug. 11, 2008.

* cited by examiner

*Primary Examiner*—Joseph P Hirl
(74) *Attorney, Agent, or Firm*—Park, Vaughan & Fleming LLP (57) ABSTRACT

One embodiment of the present invention provides a method and a system for building a parallel hybrid spill tree to facilitate parallel nearest-neighbor matching operations. During operation, the system receives a set of objects to be stored in the parallel hybrid spill tree. The system selects a subset of objects from the set of objects, and then uses this subset to create a "top tree." Each node in the top tree defines an associated partition for the parallel hybrid, spill tree. The system uses the top tree to associate each object in the set of objects with a corresponding partition of the parallel hybrid spill tree. Then, the system builds for each partition of the parallel hybrid spill tree an associated "leaf sub-tree" containing the objects in the partition, with each leaf sub-tree structured as a spill tree.

18 Claims, 7 Drawing Sheets

BUILDING PARALLEL HYBRID SPILL TREES TO FACILITATE PARALLEL NEAREST-NEIGHBOR MATCHING OPERATIONS

RELATED APPLICATION

The subject matter of this application is related to the subject matter in a co-pending non-provisional application by the same inventors as the instant application and filed on the same day as the instant application entitled, "Performing a Parallel Nearest-Neighbor Matching Operation Using a Hybrid Spill Tree," having U.S. patent application Ser. No. 11/346,080, filed on 1 Feb. 2006. This application also claims priority under 35 U.S.C. §119(e) to U.S. Provisional Application Ser. No. 60/735,617, filed on 12 Nov. 2005, the contents of which are herein incorporated by reference.

BACKGROUND

1. Field of the Invention

The present invention relates to the problem of finding the nearest neighbor to an object in a set of objects. More specifically, the present invention relates to a method and an apparatus for building and querying a parallel hybrid spill tree to facilitate parallel nearest-neighbor matching operations.

2. Related Art

The proliferation of the Internet and digital photography have made large-scale image collections containing billions of images a reality. However, such large-scale image collections are difficult to organize and navigate. One operation that can simplify the task of organizing images is to identify and remove near-duplicate images in a collection. Near-duplicate images of popular items, such as book covers, CD covers, and movie posters, appear frequently on the web, since such items are often scanned or photographed multiple times with varying resolutions and color balances. Efficient and scalable techniques for locating nearest neighbors in the image feature space and clustering them together are helpful for removing such near-duplicates.

Previous work has shown that a variant of metric trees, known as "hybrid spill trees," can be used to efficiently locate approximate nearest neighbors in high-dimensional spaces with high accuracy and speed. However, existing techniques that use this data structure to identify near-duplicates, similar objects, and/or nearest neighbors are designed for a single machine, and consequently do not scale to large-scale collections.

Hence, what is needed is a method and an apparatus that facilitates partitioning parallel nearest-neighbor matching operations without the limitations of the above-described techniques.

SUMMARY

One embodiment of the present invention provides a method and a system for building a parallel hybrid spill tree to facilitate parallel nearest-neighbor matching operations. During operation, the system receives a set of objects to be stored in the parallel hybrid spill tree. Next, the system selects a subset of objects from the set of objects, and then uses this subset to create a "top tree," wherein each node in the top tree defines an associated partition for the parallel hybrid spill tree. The system uses this top tree to associate each object in the set of objects with a corresponding partition of the parallel hybrid spill tree. Next, for each partition, the system builds an associated "leaf sub-tree" containing the objects in the partition, wherein each leaf sub-tree is structured as a hybrid spill tree.

In a variation on this embodiment, the system builds and maintains each leaf sub-tree on a separate server to facilitate parallel operations on the parallel hybrid spill tree.

In a variation on this embodiment, the system uses upper and lower bounds for the partition sizes when creating the top tree.

In a variation on this embodiment, the system replicates the top tree on multiple servers.

In a variation on this embodiment, the system structures the top tree as a metric tree to reduce the amount of overlap and duplication between partitions.

In a variation on this embodiment, the system structures the top tree as a spill tree.

In a further variation, the system determines an overlap window for the spill tree based on an estimated average distance between the nearest neighbors in a specified set of objects and the dimensionality of the object space.

In a variation on this embodiment, each object in the set of objects includes a feature vector. A search for a given object returns the nearest neighbors to the given object based on similarities between the corresponding feature vectors. The feature vector may be abstracted away by using a technique which, given two objects, computes the distance between them in an arbitrarily more complex way.

In a further variation, the system uses the method to determine similarities and/or duplication between objects which can include images, documents, products, three-dimensional models, music, pornographic materials, unsolicited email or documents ("spam"), books, and video.

In a further variation, the system adjusts an overlap window for a hybrid spill tree in the parallel hybrid spill tree to change the parallel behavior of the parallel hybrid spill tree. For instance, when processing a query on a top tree, a narrower overlap window results in less object duplication at the cost of additional leaf sub-tree searches, while a wider overlap window results in higher object duplication as a cost of reducing the number of leaf sub-tree searches.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Nearest-Neighbor Search

Nearest-neighbor searching is a sub-problem in many machine learning and clustering techniques. Solving this problem typically involves comparing "feature vectors" for objects. A feature vector describes the features of each object as a multi-dimensional vector. Given a new object's features, the goal is to find an existing object in the object space that has the closest feature vector according to some distance measure, such as Euclidean distance. Over the years, techniques for solving the nearest-neighbor problem have evolved from performing a linear search of all objects, to using k-dimensional (k-D) trees which specify axis-parallel partitions of the data, to metric trees (or ball trees) which split the data with arbitrary hyperplanes, and most recently to spill trees.

Figure 1A:
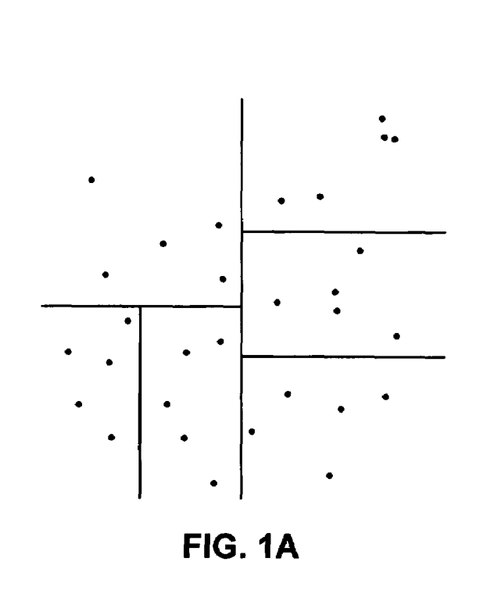
FIG. 1A illustrates a two-dimensional k-D partitioning of a set of objects in accordance with an embodiment of the present invention.
Figure 1B:
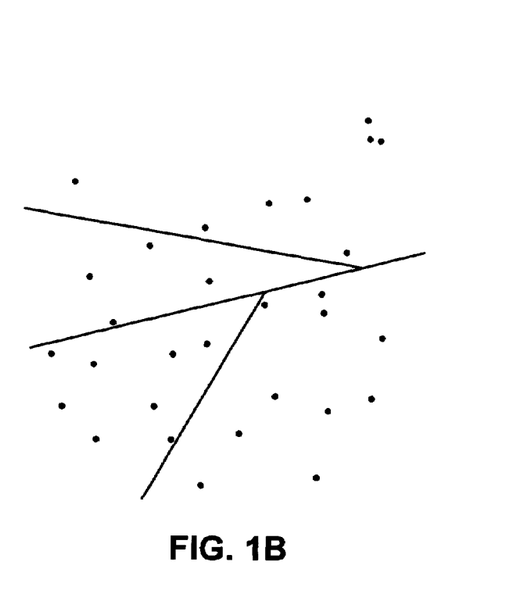
FIG. 1B illustrates a partitioning using a two-dimensional metric tree in accordance with an embodiment of the present invention.

FIG. 1A illustrates an example of a two-dimensional k-D partitioning, in which all of the partition boundaries are parallel to the x- and y-axes. FIG. 1B illustrates a partitioning using a two-dimensional metric tree, which differs from a k-D tree in that the partition boundaries can be arbitrary hyperplanes that are no longer parallel to the axes. Note that k-D trees are a subset of metric trees.

Figure 1C:
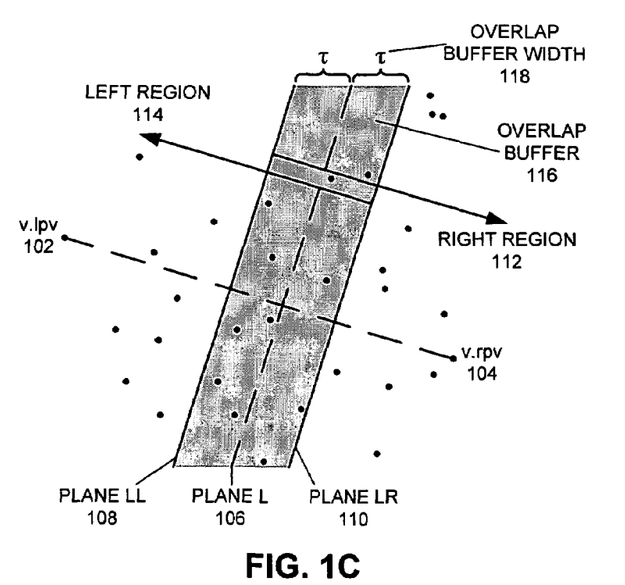
FIG. 1C illustrates partitioning using a spill tree in accordance with an embodiment of the present invention.

FIG. 1C illustrates a partitioning using a spill tree. A spill tree is a variant of a metric tree that supports efficient approximate nearest-neighbor (NN) searches. Unlike metric trees, the children of a spill tree node can share objects. Let N(v) denote the set of objects represented by a node v, and v.lc and v.rc denote the left child and the right child of the node v. Two pivot points, v.lpv 102 and v.rpv 104, are used to find a decision boundary plane L 106. The partition procedure for a metric tree would imply that the point sets of v.lc and v.rc would be disjoint, separated by the decision boundary plane L 106 shown in FIG. 1C. In a spill tree, however, the splitting criteria are relaxed to allow overlaps between two children. The system defines two new separating planes, plane LL 108 and plane LR 110, which are parallel to plane L 106 and at distance r from plane L 106. All of the objects to the right of plane LL 108 belong to the child v.rc and the right region 112, and all of the objects to the left of plane LR 110 belong to the child v.lc and the left region 114. The point sets v.lc and v.rc share all of the objects that fall in the region between plane LL 108 and plane LR 110. This region is called the overlap buffer 116, and the distance τ is called the overlap buffer width 118.

A spill-tree-based k-NN search is a defeatist search, where the system descends the tree quickly using the decision boundaries at each level without backtracking. In practice, hybrid spill trees are typically used. Hybrid spill trees are a combination of spill trees and metric trees, where the system decides at each node whether to use an overlapping node or non-overlapping node. The system only uses defeatist search on overlapping nodes, instead using conventional backtracking techniques for metric tree nodes. Note that r is a critical parameter for both tree generation and search, since generally, the greater the value of τ, the more accurate but also slower the search technique becomes.

The above-described techniques are performed serially, on a single machine that has random access to the entire set of objects to be placed in the tree. The present invention extends these techniques to facilitate parallel operation across multiple machines to handle large data sets that cannot fit into a single computer's memory. The following specification describes how to build a parallel hybrid spill tree that allows the system to handle a large number of queries efficiently in parallel, as well as automatically set the overlap buffer size.

As mentioned previously, the nodes illustrated in the trees described may represent an object using a feature vector. Before building a search tree, the system may first need to transform the objects into a feature vector representation. In one embodiment of the present invention, the system creates feature vectors for a set of images by first normalizing an image by scaling the maximum value of each color channel to cover the full range of intensities, and then scaling the image to a fixed size of 64×64 pixels. One obvious representation might be the image pixels themselves. However, this would likely be quite sensitive to noise and other small image variations. Therefore, the system instead uses an adaptation of a known technique to convert the image to a Haar wavelet domain, with the wavelet coefficients quantized to ±1, and all but the largest 60 magnitude coefficients simply set to zero. The feature vector as described is quite large, 64×64×3, so the system uses random projection to reduce the dimensionality of the feature vector to 100 dimensions. The system then appends the average of each color channel and the aspect ratio w/(w+h) to this feature vector for a total of 104 dimensions. Note that the nearest-neighbor technique described in the present invention is designed to handle generic feature vectors, and is not restricted to this particular application.

Building Parallel Hybrid Spill Trees for Parallel Nearest-Neighbor Matching

A significant challenge in scaling up traditional hybrid-spill-tree generation is that the system needs to keep all the objects' feature vectors in memory to provide random access. When the number of objects becomes large enough, it is no longer possible to store everything in memory. For instance, if the system uses 104 floating-point numbers, or roughly 416 bytes, to represent each object, two million points could fit comfortably on a machine with 1 GB of memory. For this example, a collection of over a billion images contains nearly five hundred times as much feature vector data as can fit on one machine.

One way to partition the data set might be to randomly partition the data, building a separate hybrid spill tree for each partition. However, at query time, this would require each query to run through all of the trees. While this query could execute in parallel, the overall query throughput would be limited.

One embodiment of the present invention produces a more intelligent partitioning of the data by using a metric tree structure. First, the system creates a random data sample small enough to fit on a single machine (let 1/M=the fraction of the data that would fit on a single machine), and builds a metric tree for this data. Each of the leaf nodes in this "top tree" then defines a partition for which the system builds a hybrid spill tree on a separate machine. The overall tree, consisting of the top tree along with all the "leaf sub-trees," can be viewed conceptually as a single hybrid spill tree that spans a large number of machines. By splitting the tree across the multiple leaf sub-trees, the system keeps more feature vectors in memory, thereby increasing system scale to encompass arbitrarily large sets of objects, given sufficient servers.

While the embodiment of the present invention described above structures the top tree as a metric tree, another embodiment structures the top tree as a spill tree. When the top tree is a spill tree, the system avoids the need to backtrack during search, thereby avoiding the need to search multiple leaf sub-trees. However, a negative aspect of spill trees is that objects appear in multiple leaf sub-trees. As a result, using a spill tree for the top tree can lead to a significant increase in the total storage required by the system. The techniques described in the following description use a metric tree for the top tree.

When building the top-level metric tree, the system needs a stopping condition for the leaves. Typically, the tree-building algorithm defines the stopping condition as an upper bound on the leaf size. In one embodiment of the present invention, the system sets the upper bound U such that the expected number of objects U·M that will fall into a single leaf sub-tree can fit on a single machine. The system can set U·M a factor of two or more smaller than the actual limit, to allow for variability in the actual number of objects partitioned into each leaf. The system can additionally set a lower bound L on the number of nodes to prevent individual partitions from being too small.

Figure 2:
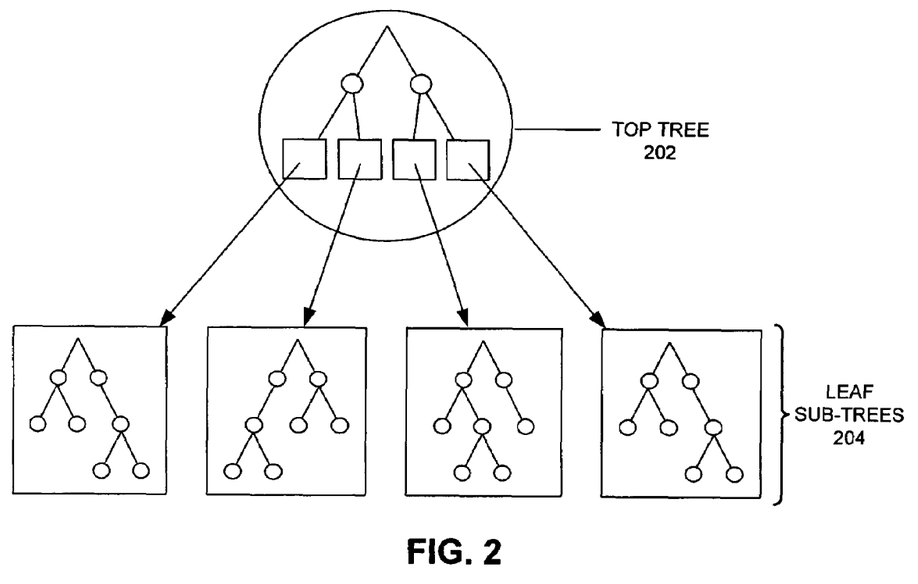
FIG. 2 illustrates a parallel hybrid spill tree in accordance with an embodiment of the present invention.
Figure 3:
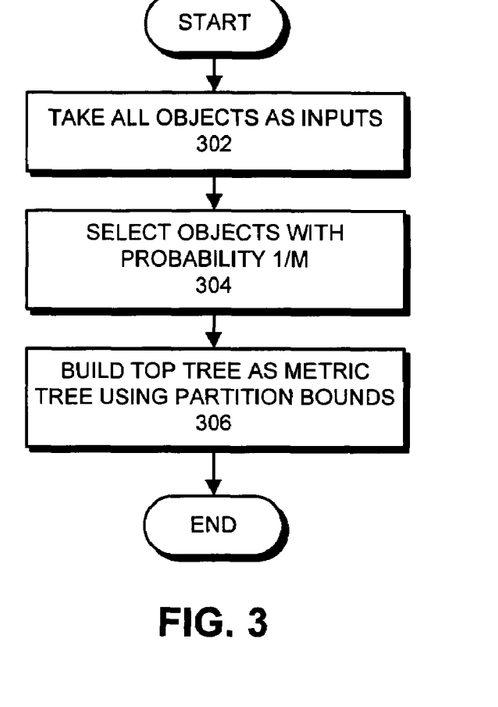
FIG. 3 presents a flow chart illustrating the process of building a top tree in accordance with an embodiment of the present invention.

FIG. 2 illustrates a parallel hybrid spill tree in which the top tree 202 and each of the leaf sub-trees 204 are located on different machines. FIG. 3 presents a flow chart illustrating the process of building a top tree. This procedure takes all of the objects in a collection as an input (step 302), and selects objects with probability 1/M (step 304). The system then uses the selected output objects to build the top tree as a metric tree using a set of partition bounds (step 306).

Figure 4:
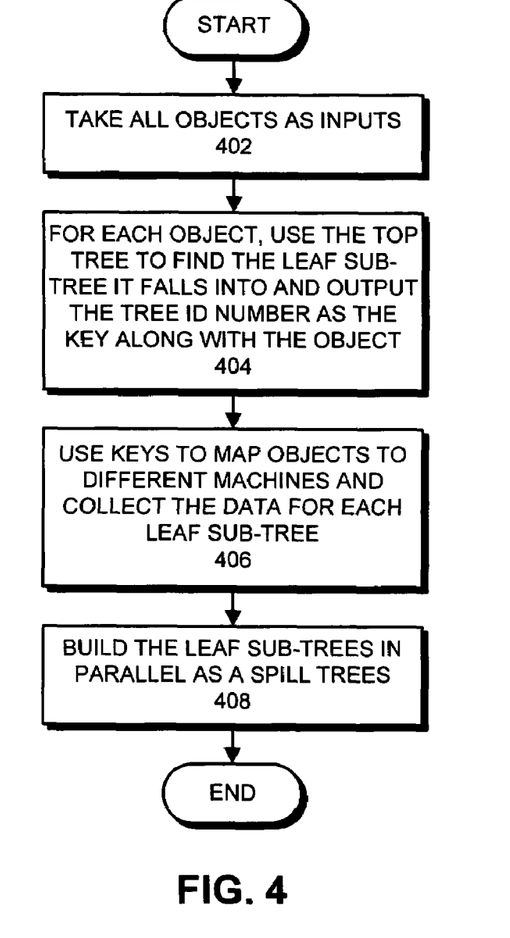
FIG. 4 presents a flow chart illustrating the process of partitioning input objects and creating the leaf sub-trees of the parallel hybrid spill tree in accordance with an embodiment of the present invention.

FIG. 4 presents a flow chart illustrating the process of partitioning the input objects and creating the leaf sub-trees of the parallel hybrid spill tree. The system takes all of the objects in the collection as input (step 402), and then proceeds to use the top tree to find the leaf sub-tree that each object falls into (step 404). As a result of this procedure, each object is associated with a distinct key corresponding to a distinct leaf sub-tree. The system uses this distinct key to map the objects to the different machines, so that each machine can collect the data for its corresponding leaf sub-tree (step 406). After the system partitions the objects, the machines build their respective leaf sub-trees in parallel as spill trees (step 408). Each leaf sub-tree decides for each node in its partition whether to use a spill tree with overlap or a metric tree, based on how many objects fall into the overlap buffer regions.

Note that the system can replicate the top tree on multiple servers to parallelize the partitioning procedure.

Querying Parallel Hybrid Spill Trees for Parallel Nearest-Neighbor Matching

After the system builds the parallel hybrid spill tree, it can query it in nearest-neighbor matching operations. As mentioned earlier, the top tree together with the leaf sub-trees can be viewed as one large hybrid spill tree. The normal way to query a spill tree allows for backtracking through non-overlapping nodes, such as those that appear in the top tree, whenever a partition boundary is found to be closer to the queried object than the nearest neighbor found in the current partition. However, such an approach would be expensive to implement for a parallel hybrid spill tree, since the entire tree is not stored on a single machine. Instead, in one embodiment, the system speculatively sends each query object to multiple leaf sub-trees when the query object is close enough to the partition boundary. This effectively provides a run-time version of the overlap buffer, which was previously only applied at tree building time. The benefit of this technique is that fewer machines are required to hold the leaf sub-trees (because there is no duplication of objects across the sub-trees), but with the expense that the system may send each query to several leaf sub-trees during search. In practice, the system can adjust the overlap buffer size to control the amount of computation done at query time.

Figure 5:
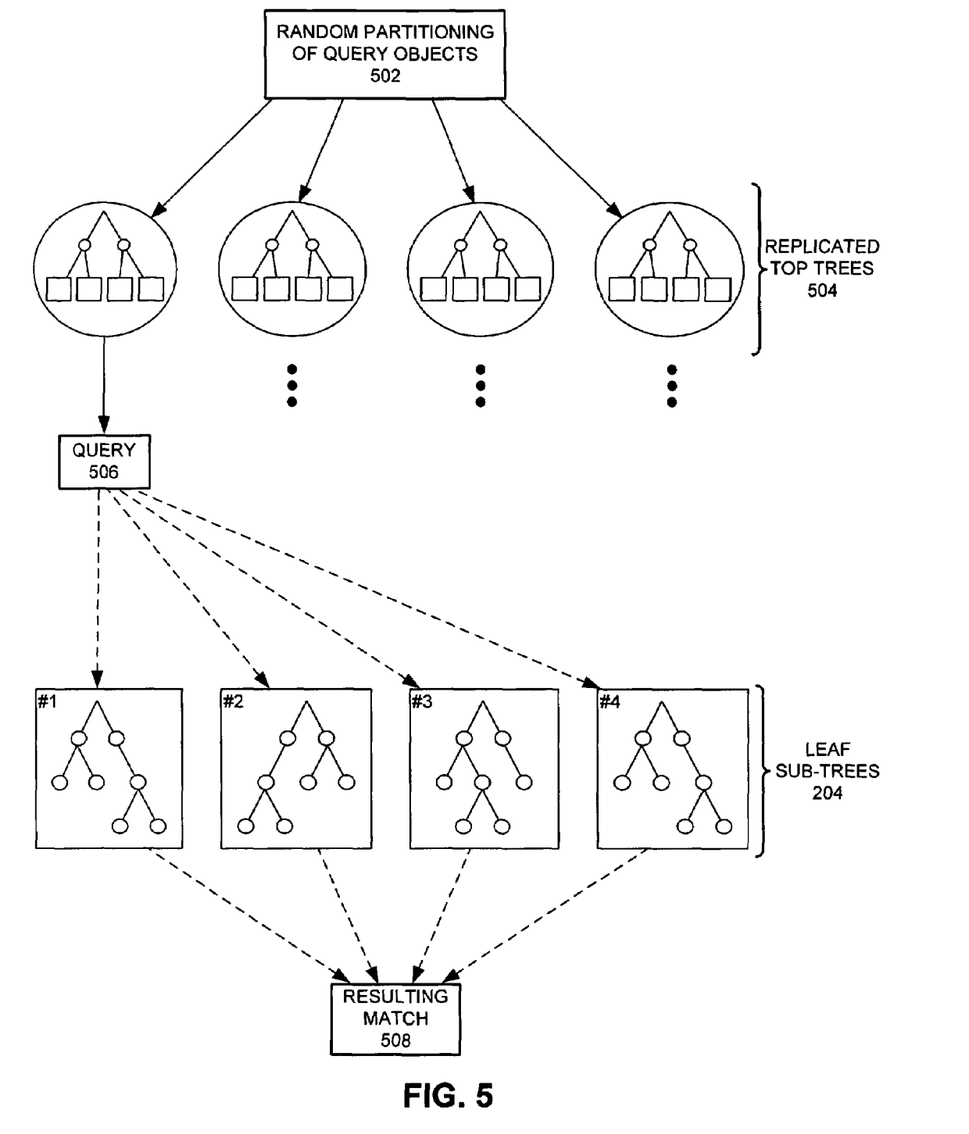
FIG. 5 illustrates the processing of a query into a parallel hybrid spill tree which includes a replicated top tree in accordance with an embodiment of the present invention.
Figure 6:
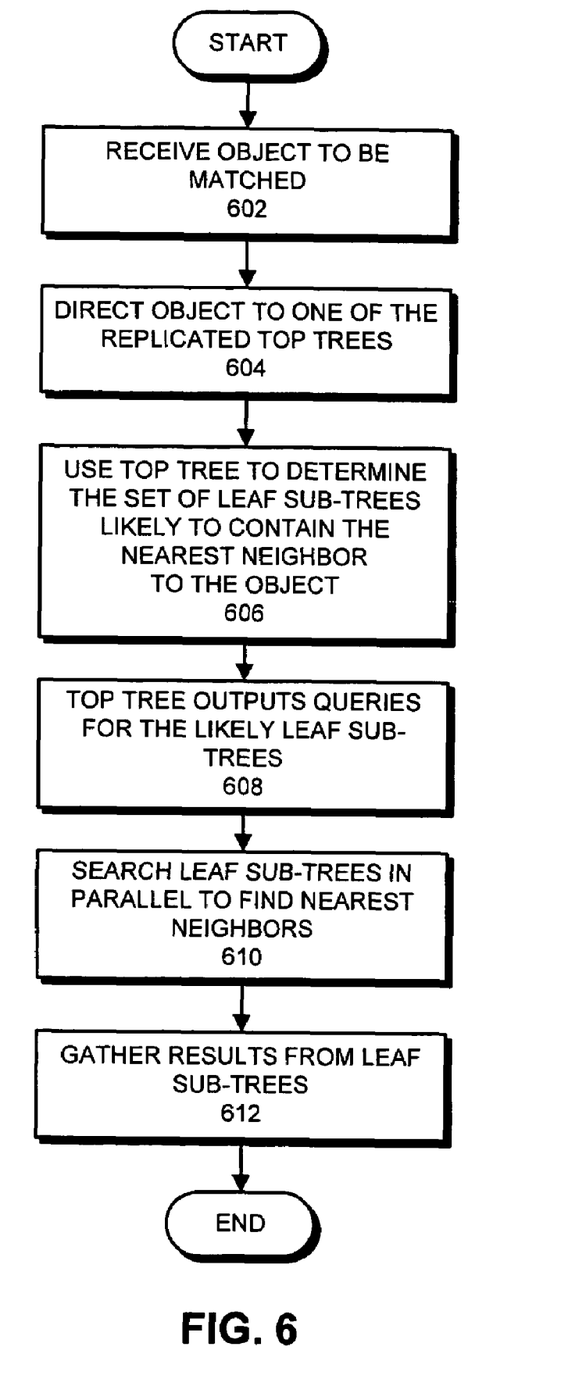
FIG. 6 presents a flow chart illustrating the process of querying of a parallel hybrid spill tree in accordance with an embodiment of the present invention.

FIG. 5 illustrates a query into a parallel hybrid spill tree with replicated top trees in accordance with an embodiment of the present invention. FIG. 6 presents a corresponding flow chart illustrating the querying of the parallel hybrid spill tree. First, an object to be matched is received (step 602). The system randomly directs this object 502 to one of the replicated top trees 504 (step 604), which then determines the set of leaf sub-trees that might contain the nearest neighbor to the object (step 606). The top tree outputs the object as a query 506 to the likely leaf sub-trees (step 608), which are then searched in parallel to find the respective nearest neighbor in each partition (step 610). Finally, if more than one leaf sub-tree was involved in the query, the system gathers the results to determine the resulting match 508 (step 612).

The system can exploit replicated top trees and parallel searches for objects across leaf sub-trees stored on different machines to dramatically increase the number of simultaneous parallel queries. Note that the system can also replicate leaf sub-trees, if necessary, to further increase the parallelization or redundancy of the matching operations.

Note that the techniques in the present invention can be applied to determine similarities and/or duplication between any set of objects that can be described as feature vectors, including images, documents, products, three-dimensional models, music, pornographic materials, unsolicited email or documents ("spam"), books, and video. The methods to build and query parallel hybrid spill trees can be used, but are not limited, to determining similarity and/or duplication in fraud detection, fingerprint recognition, face recognition, optical character recognition, product search, data clustering, language detection, machine learning and classification problems, a search through SIFT descriptors, or a recommendation engine for products.

Data Clustering

Figure 7:
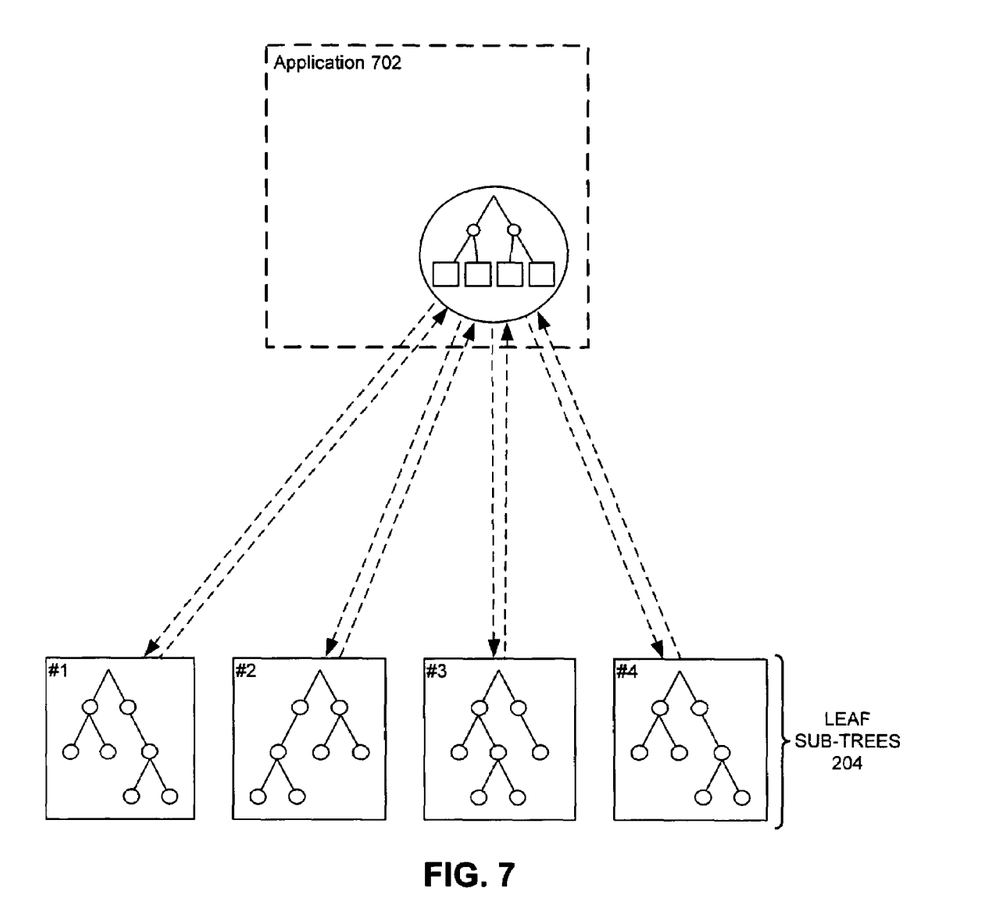
FIG. 7 illustrates an application that performs on-line nearest-neighbor matching operations in accordance with an embodiment of the present invention.

The system described in the present invention can perform nearest-neighbor matching operations in both an on-line mode, in which the system receives a query object and proceeds to find the nearest neighbor, or in an off-line (batch) mode, in which the nearest neighbors are found for every point in a collection. Since the system may need many machines to efficiently query a large collection of objects, the query system can in one embodiment be arranged as a "nearest-neighbor service" which accepts a query and returns the closest neighbors. In this configuration, one or more machines contain the top tree, and direct the query to one or more leaf machines. The top tree(s) may be located on a different machine from the client (as is typical of services), or may be located on the same machine, perhaps even in the same process. One application of such a service is an image retrieval application. FIG. 7 illustrates an example of an on-line application 702 that incorporates the top tree and sends out queries directly to a set of leaf sub-trees 204.

The system described is not restricted to nearest-neighbor matches, and can be set to find the n nearest matches to an object. A sample application in which the system searches for n nearest-neighbor matches is data clustering, a batch process during which the system finds the n nearest neighbors for every object in the parallel hybrid spill tree.

Figure 8:
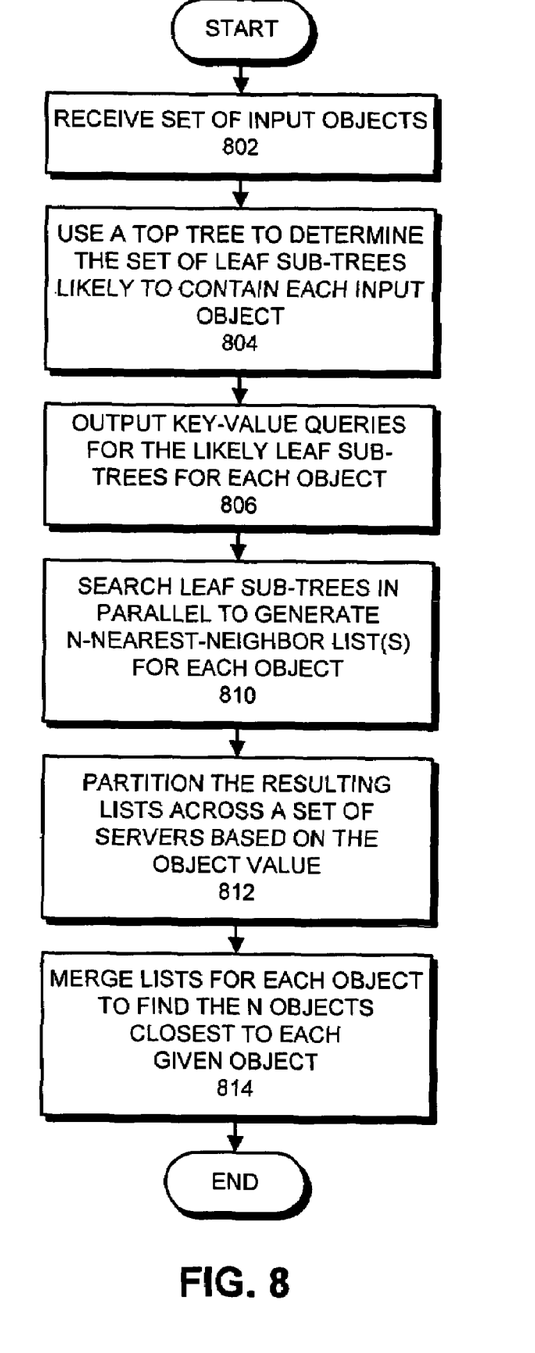
FIG. 8 presents a flow chart illustrating data clustering using nearest-neighbor matching in accordance with an embodiment of the present invention.

FIG. 8 presents a flow chart illustrating data clustering using nearest-neighbor matching. The system first receives a set of input objects (step 802), which in this example is the set of objects in the parallel hybrid spill tree. For each input object, the system uses the top tree to determine which leaf sub-tree(s) the object falls into (step 804). At each node in the top tree, the system may send the input object down both sides of the tree if it falls within the overlap buffer width of the decision plane. The system generates a key-value query pair for each leaf sub-tree to be searched for the n nearest neighbors (step 806), and proceeds to search the hybrid-spill-trees for each query routed to a leaf sub-tree, generating a set of n-nearest-neighbor lists for each participating leaf sub-tree (step 810). The system then partitions the objects and their resulting lists across a set of servers based on each individual object's key value (step 812). Finally, the system merges the lists in parallel to find the final n nearest neighbors for each object (step 814).

Note that the system can apply a threshold distance as a practical step during the clustering procedure, to drop nearest neighbor images that are considered too far apart to be members of the same cluster.

Parameter Estimation

As mentioned previously, one of the important parameters for spill tree generation and search is the "overlap buffer width." The overlap buffer width should ideally be large enough to always include the n nearest neighbors of a point, to guarantee that these neighbors will always be found. However, a smaller value may be acceptable if the system is able to tolerate a certain number of errors. One embodiment of the present invention includes a way to estimate the ideal overlap buffer size, which is then relaxed in practice (by making the buffer smaller) to improve speed.

To estimate the overlap buffer size, the system first estimates $R_S$, the average distance (averaged over the objects in set S) to their nearest neighbors. If we make the approximation that points are uniformly distributed, the number of objects falling within a certain radius of a given object should be proportional to the density of the objects (which is in turn proportional to the number of samples $N_S$) raised to the power of the dimensionality of the manifold d on which the points are distributed. In particular, if the expected number of points is fixed to 1, then the radius of interest is $R_S$, giving the following equation:

$$1 \propto N_S \cdot R_S^d. \quad \text{(Equation 1)}$$

Isolating $R_S$ gives the following relationship, introducing a proportionality constant c:

$$R_S = \frac{c}{N_S^{1/d}}. \quad \text{(Equation 2)}$$

To compute $R_S$ for the whole set of objects $S_{all}$, the system first needs to estimate the constant c and the effective dimensionality d. The system can estimate these by generating a number of different sized subsets of the data, e.g. typically between 20 and 500 samples. For each of these sets, the system finds the nearest neighbor of each point by computing all $N_S^2$ distances, and recording the average distance to the nearest neighbor of each point. Taking the log of both sides of Equation 2 allows c and d to be estimated using standard linear regression methods. Plugging these values along with the full sample set size into Equation 2 provides an estimate of the average nearest-neighbor distance over the whole set.

In one embodiment of the present invention the system sets the overlap buffer size to $R_S$. However, in another embodiment the system takes into account that the partition hyperplanes are unlikely to be perpendicular to the vector between objects which are $R_S$ apart. According to the Johnson-Lindenstrauss lemma, after randomly projecting a point from the effective dimensionality d of the samples down to the one dimensional space normal to the partitioning hyperplane, the expected distance will be:

$$2\tau = \frac{R_S}{\sqrt{d}}. \quad \text{(Equation 3)}$$

Equation 3 yields an estimate of the overlapping buffer size. As mentioned earlier, the system typically chooses a smaller value for the overlap buffer than what is computed above for greater efficiency, but the above procedure provides an efficient method to get close to the right value.

Note that using parallel hybrid spill trees for parallel nearest-neighbor matching is in part appealing because of the relatively small set of parameters that the system needs to tune for different domains. This reduced tuning results in improved efficiency over other techniques that require more elaborate tuning, such as locality-sensitive hashing.

One embodiment of the present invention further tunes the partition bounds when building the top tree, to alleviate a potential bottleneck caused by the fact that the number of objects in each leaf sub-tree is not controlled precisely, but only approximated by the lower bound L and the upper bound U. Since the system builds the top tree using a small sample of the data, the top-tree approximation will have errors. An alternative procedure builds the top tree with a stopping condition of a single object per leaf node. After doing this, the system runs all of the objects through the tree, and records counts for how often an object reaches each leaf node. The system then uses this information to prune back the top tree until the nodes are within a desired size range, thereby controlling the sub-problem more precisely.

In summary, the present invention describes a method for building and querying distributed parallel hybrid spill trees for efficient online or batch searches for the nearest neighbors of points in high-dimension space. These techniques provide improved scalability and performance by allowing a system to leverage additional servers for nearest-neighbor match.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for building a parallel hybrid spill tree to facilitate parallel nearest-neighbor matching operations, comprising:
   receiving a set of objects to be stored in the parallel hybrid spill tree, wherein the size of the set of objects is larger than the available memory of a computing device;
   selecting a subset of objects from the set of objects, wherein the subset of objects fits in the available memory of the computing device;
   using the selected subset of objects to create a "top tree" that partitions the set of objects;
   wherein the top tree is structured as a hybrid spill tree, and each leaf node in the top tree defines an associated partition for the parallel hybrid spill tree;
   using the top tree to associate each object in the set of objects with one or more corresponding partitions of the parallel hybrid spill tree;
   for each partition of the parallel hybrid spill tree, building an associated "leaf sub-tree" for objects in the partition, wherein each leaf sub-tree is structured as a hybrid spill tree;
   wherein the partitioned subsets of objects associated with the leaf nodes in the top tree are distributed across multiple computing devices; and
   using the parallel hybrid spill tree to perform and display the results of a nearest-neighbor matching operation for the set of objects.

2. The method of claim 1, wherein the method further comprises building and maintaining each leaf sub-tree on a separate server to facilitate parallel operations on the parallel hybrid spill tree.

3. The method of claim 1, wherein creating the top tree comprises using upper and lower bounds for the partition sizes.

4. The method of claim 1, wherein the top tree is replicated on multiple servers.

5. The method of claim 1, wherein creating the top tree comprises structuring the top tree as a metric tree to reduce the amount of overlap and duplication between partitions.

6. The method of claim 1, wherein an overlap window is determined for each hybrid spill tree in the parallel hybrid spill tree based on an estimated average distance between the nearest neighbors in a specified set of objects and the dimensionality of the object space.

7. The method of claim 1,
   wherein each object in the set of objects includes a feature vector; and
   wherein a search for a given object returns nearest neighbors to the given object based on similarities between the corresponding feature vectors.

8. The method of claim 7, wherein the method is used to determine similarities and/or duplication between objects that may include but are not limited to:
   images;
   documents;
   products;
   three-dimensional models;
   music;
   pornographic materials;
   unsolicited email or documents ("spam");
   books; and
   video.

9. A computer-readable storage medium storing instructions that when executed by a computer cause the computer to perform a method for building a parallel hybrid spill tree to facilitate parallel nearest-neighbor matching operations, the method comprising:
   receiving a set of objects to be stored in the parallel hybrid spill tree, wherein the size of the set of objects is larger than the available memory of a computing device;
   selecting a subset of objects from the set of objects, wherein the subset of objects fits in the available memory of the computing device;
   using the selected subset of objects to create a "top tree," partitions the set of objects;
   wherein the top tree is structured as a hybrid spill tree, and each leaf node in the top tree defines an associated partition for the parallel hybrid spill tree;
   using the top tree to associate each object in the set of objects with one or more corresponding partitions of the parallel hybrid spill tree;
   for each partition of the parallel hybrid spill tree, building an associated "leaf sub-tree" for nodes in the partition, wherein each leaf sub-tree is structured as a hybrid spill tree
   wherein the partitioned subsets of objects associated with the leaf nodes in the top tree are distributed across multiple computing devices; and
   using the parallel hybrid spill tree to perform and display the results of a nearest-neighbor matching operation for the set of objects.

10. The computer-readable storage medium of claim 9, wherein the method further comprises building and maintaining each leaf sub-tree on a separate server to facilitate parallel operations on the parallel hybrid spill tree.

11. The computer-readable storage medium of claim 9, wherein creating the top tree comprises using upper and lower bounds for the partition sizes.

12. The computer-readable storage medium of claim 9, wherein the top tree is replicated on multiple servers.

13. The computer-readable storage medium of claim 9, wherein creating the top tree comprises structuring the top tree as a metric tree to reduce the amount of overlap and duplication between partitions.

14. The computer-readable storage medium of claim 9, wherein an overlap window is determined for each hybrid spill tree in the parallel hybrid spill tree based on an estimated average distance between the nearest neighbors in a specified set of objects and the dimensionality of the object space.

15. The computer-readable storage medium of claim 9,
   wherein each object in the set of objects includes a feature vector; and
   wherein a search for a given object returns nearest neighbors to the given object based on similarities between the corresponding feature vectors.

16. The computer-readable storage medium of claim 15, wherein the method is used to determine similarities and/or duplication between objects that may include but are not limited to:
   images;
   documents;
   products;
   three-dimensional models;
   music;
   pornographic materials;
   unsolicited email or documents ("spam");
   books; and
   video.

17. An apparatus for building a parallel hybrid spill tree to facilitate parallel nearest-neighbor matching operations, comprising:

- a receiving mechanism configured to receive a set of objects to be stored in the parallel hybrid spill tree, wherein the size of the set of objects is larger than the available memory of a computing device;
- a selection mechanism configured to select a subset of objects from the set of objects, wherein the subset of objects fits in the available memory of the computing device;
- a creation mechanism to use the selected subset of objects to create a "top tree," that partitions the set of objects;
- wherein the top tree is structured as a hybrid spill tree, and each leaf node in the top tree defines an associated partition for the parallel hybrid spill tree;
- an association mechanism to use the top tree to associate each object in the set of objects with one or more corresponding partitions of the parallel hybrid spill tree;
- a build mechanism to, for each partition of the parallel hybrid spill tree, build an associated "leaf sub-tree" for nodes in the partition, wherein each leaf sub-tree is structured as a hybrid spill tree;
- wherein the partitioned subsets of objects associated with the leaf nodes in the top tree are distributed across multiple computing devices; and
- wherein the apparatus is configured to use the parallel hybrid spill tree to perform and display the results of a nearest-neighbor matching operation for the set of objects.

18. The apparatus of claim 17, wherein the apparatus further comprises building and maintaining each leaf sub-tree on a separate server to facilitate parallel operations on the parallel hybrid spill tree.

* * * * *